United States Patent [19]
Rolfes

[11] Patent Number: 5,875,703
[45] Date of Patent: Mar. 2, 1999

[54] COFFEE BREWER AND HOT WATER DISPENSER

[76] Inventor: Patrick J. Rolfes, 2006 Seadrift, Corona Del Mar, Calif. 92625

[21] Appl. No.: 131,526

[22] Filed: Aug. 10, 1998

[51] Int. Cl.⁶ ..................................................... A47J 31/40
[52] U.S. Cl. ................................ 99/283; 99/290; 99/304; 222/146.5
[58] Field of Search .............................. 99/283, 282, 290, 99/284, 288, 323.3, 304, 306, 316; 222/146.5, 146.2, 192

[56] References Cited

U.S. PATENT DOCUMENTS

| | | | |
|---|---|---|---|
| 4,603,620 | 8/1986 | Daugherty | 99/300 |
| 4,621,571 | 11/1986 | Roberts | 99/280 |
| 5,063,836 | 11/1991 | Patel | 99/281 |
| 5,404,794 | 4/1995 | Patel et al. | 99/280 |

Primary Examiner—Reginald L. Alexander
Attorney, Agent, or Firm—Gordon K. Anderson

[57] ABSTRACT

A coffee brewer and hot water dispenser, which includes a brew water tank (30), with water heated to a pre-determined temperature by a pre-heater (38). A boiler (50) boils the pre-heated water into a spray head (56) and into a ground coffee containing cone (114). A separate hot water tank (70) is heated by a heater (72), and a solenoid valve (74) dispenses hot water into a container. Fill, water level dispensing and process control use a solid state electronic controller (140) interconnected to an indicating control panel (112). The improvement permits larger capacity by the use of a bypass hot water cycle adding a predetermined volume of water to the container and supplementing the control by expanding its capabilities using multiple sequencing of the brew cycle for increasing the volume of brewed coffee.

8 Claims, 5 Drawing Sheets

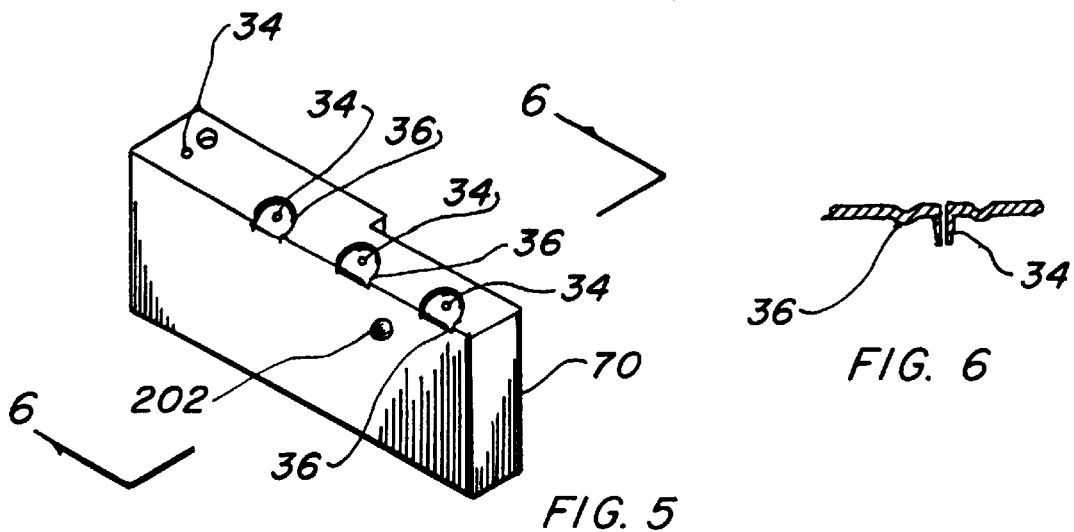
FIG. 5
FIG. 6
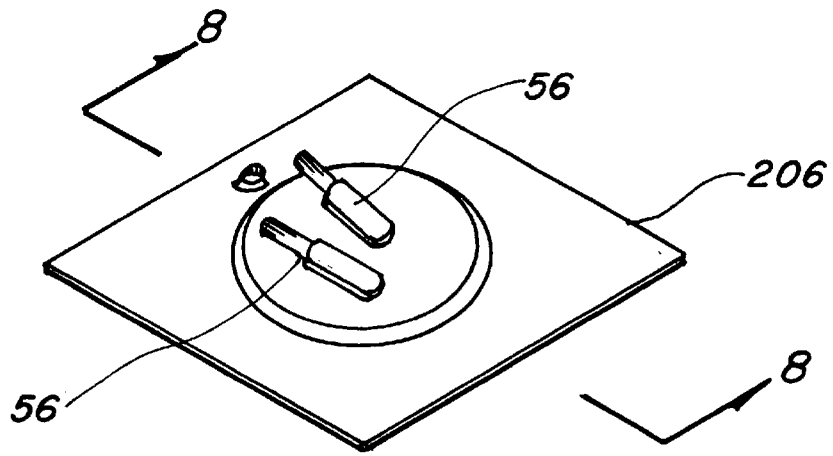
FIG. 7
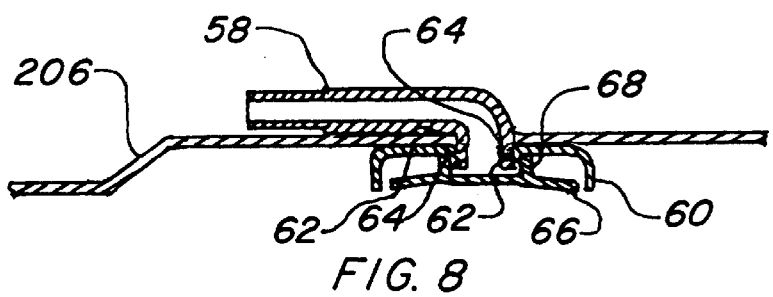
FIG. 8
FIG. 9
FIG. 10

COFFEE BREWER AND HOT WATER DISPENSER

TECHNICAL FIELD

The present invention relates to coffee making machines in general. More specifically, to improvements in the type that deliver both boiling water for coffee, contained in a filter to a brew pot, and a separate hot water system for food and beverage.

BACKGROUND ART

Previously, many type of coffee brewers have been used in endeavoring to provide an effective means for producing hot water quickly and efficiently for coffee brewing. In most cases, this hot water supply has been limited to brewers utilizing a hot water reservoir that is elevated in temperature to near boiling, providing an appropriate quantity of water to be available for brewing purposes.

Ground coffee is normally contained in a removable filter unit disposed below the outlet of the hot water reservoir. When users wish to brew a pot of coffee, they energize the controls so that cold water from another source enters the reservoir and causes hot water to exit through the ground coffee and the filter into a storage pot located on a warming plate below the filter. The water in the reservoir is then reheated, ready for brewing a subsequent pot of coffee.

It will be noted that many coffee making machines, known in the art, are also equipped with a second outlet faucet, where hot water may be withdrawn from the reservoir without passing through the coffee filter for making tea, hot chocolate, other beverage, or freeze dried soups, etc.

U.S. Pat. No. 5,063,836, issued to Patel, is such a device, however, improved to include level sensing, controlling water inlet f low to the reservoir. A solid state circuit board controls function to particularly accurate temperatures so as to preclude boiling and maintain a constant fill level compensating for evaporation.

In many instances prior art, as well as this forementioned coffee brewer, utilize a glass coffee pot for receiving the brewed coffee and, therefore, require a warming plate. Others, however, employ a vacuum sealed, capped server that maintains the leaving liquid temperatures for long periods of time, eliminating the necessity of a warming plate.

U.S. Pat. No. 5,404,794, issued to Patel et al, is an improvement of the above described prior art and includes a tank heater for maintaining hot water in a partitioned reservoir and, also, a boiler to feed boiling water into the ground coffee contained in the removable filter. This prior art further incorporates a spigot, or external faucet, in communication with the reservoir to allow individual cups, or containers, of hot water to be withdrawn from the same source for various food reconstitution, or so-called instant beverages.

Many other coffee brewers have been developed to incorporate features of level, temperature and dispensing control. The field is actually replete with both home and commercial coffee brewers of various designs and approaches, however, the need still exists for improvements in automation, safety, and visual indication of the process.

The improvement to the coffee brewer and hot water dispenser is related to patent application Ser. No. 08/810,708 now U.S. Pat. No. 5,830,236 filed Mar. 3, 1997 by the inventor. All of the elements of this invention are used in the improvement with some additions to expand the functional operation of the device.

DISCLOSURE OF THE INVENTION

The prior art coffee brewer and hot water dispenser of the inventor to which the improvement is directed is commercially successful and is in present use for brewing up to 150, 5 oz (0.15 liter) cups per hour for the 120 volt electrical input or 204 cups per hour for the 220 volt configuration. While this capacity is acceptable in most commercial applications, the need has arisen for even larger capacity systems, such as restaurants, coffee houses and large food serving establishments. The problem is that the need may be filled by simply making the device proportionately larger with bigger tanks and heaters, etc., however, the physical size and electrical power available becomes the limiting factor. It is, therefore, a primary object of the invention to increase the size of the tanks only slightly and bypass a predetermined amount of hot water from the hot water tank directly to the coffee server. This approach permits the requisite 6 minute maximum infusion time to eliminate bitterness from the coffee grounds while increasing the volume from the brew tank by repeating the brew cycle.

An important object of the invention is that the improvement does not substantially increase the electrical maximum amperage draw requirements for the coffee brewer system, as it utilizes the same basic components, only adding multiple cycles to the existing system. This is accomplished by using the same volume probe measurements and repeating the procedure using repetitive cycles to accomplish the increase in volume. Obviously, the coffee brew cone must be larger to hold more coffee grounds in the filter and a pair of spray heads are utilized for even distribution of the boiling water over the grounds.

Another object of the invention is that with the multiple cycle brew and hot water bypass, the physical size of the apparatus is held to a minimum and the brewing time is minimized in comparison with simply proportionally increasing the size to accomplish the added volume.

Still another object of the invention is that the brew is more consistent with multiple cycles, as the brew tank is maintained at a constant temperature. Further, this improvement permits the same basic elements and controls to be employed, not limited by larger volume alone.

Yet another object of the invention is directed to the use of volumetric measurement for both the brewing and hot water bypass systems, as almost all prior art employs time or pressure to measure the amount of boiling water to be introduced during the brewing cycle. Measuring by volume is much more accurate and consistent than other methods used in the art.

These and other objects and advantages of the present invention will become apparent from the subsequent detailed description of the preferred and other embodiments, also the appended claims, further taken in conjunction with the accompanying drawings.

BRIEF DESCRIPTION OF THE DRAWINGS

FIG. 5 is a partial isometric view of the hot water tank completely removed from the invention for clarity, illustrating the addition of the bypass water probe and female boss.

FIG. 6 is a cross-sectional view taken along lines 6—6 of FIG. 5 illustrating the bypass water probe recess.

FIG. 7 is a partial isometric view of the improved spray head holder with a pair of spray heads completely removed from the invention for clarity.

FIG. 8 is a cross-sectional view taken along lines 8—8 of FIG. 7 showing a single assembled spray head attached to the spray head holder.

FIG. 9 is a partial isometric view of the inlet elbow of the spray head completely removed from the invention for clarity.

FIG. 10 is a partial isometric view of the diverting disc of the spray head completely removed from the invention for clarity.

BEST MODE FOR CARRYING OUT THE INVENTION

Figure 1:
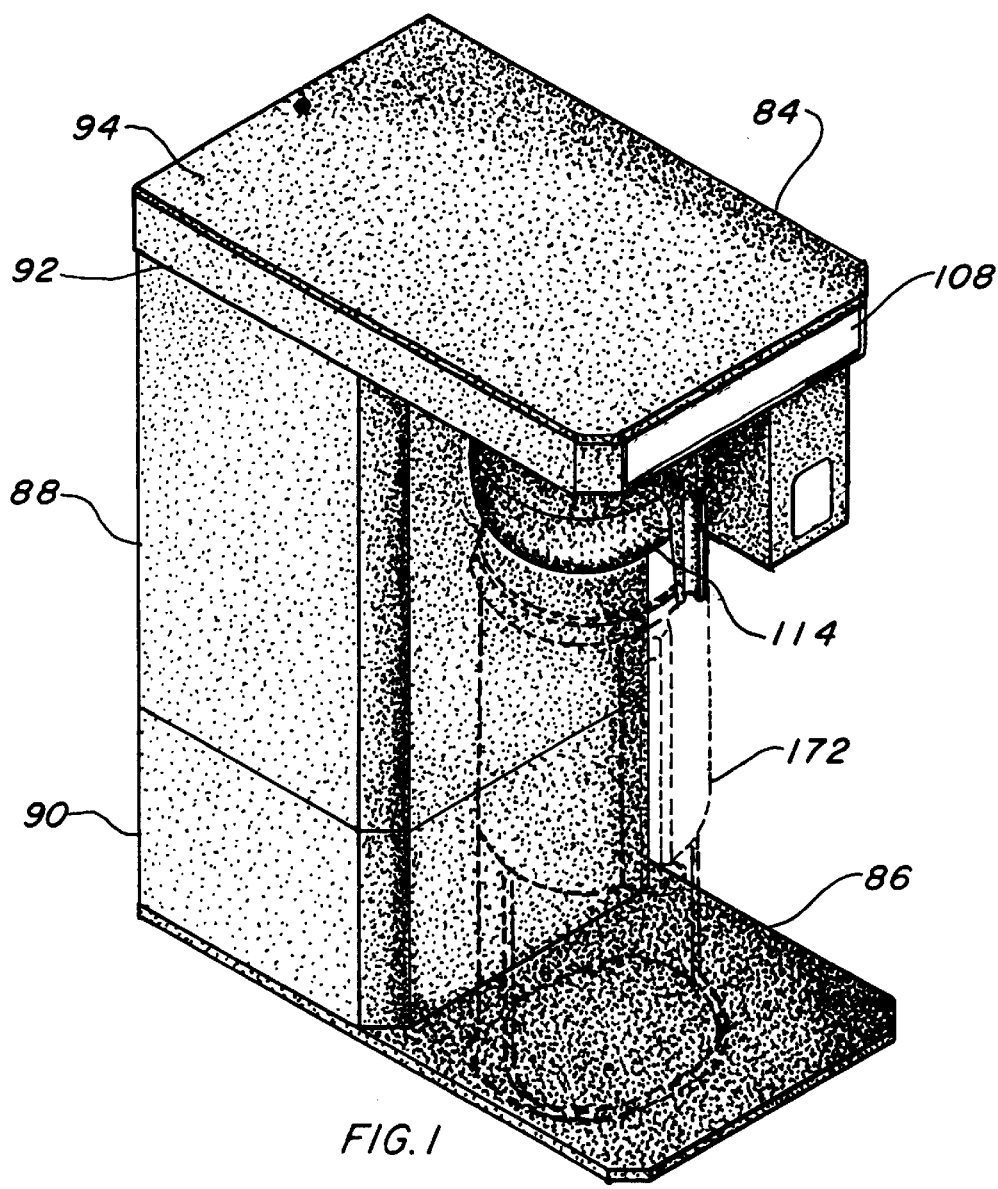
FIG. 1 is a partial isometric view of the basic preferred embodiment.
Figures 2, 3, 4:
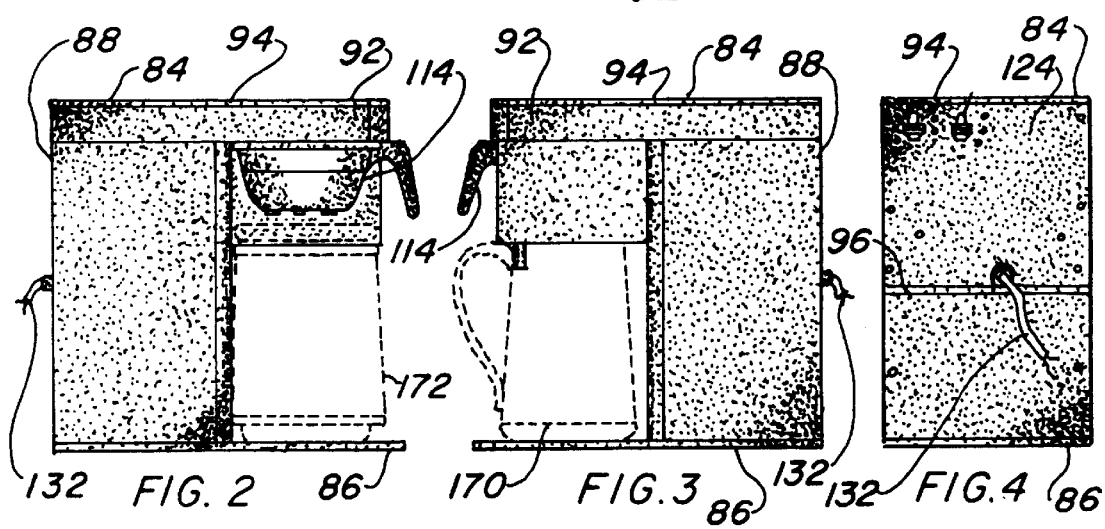
FIG. 2 is a left side view of the invention in its basic embodiment with a vacuum coffee server shown in dotted lines.
FIG. 3 is a right side view of the invention in its basic embodiment with a vacuum coffee pot shown in dotted lines.
FIG. 4 is a rear view of the invention in its basic embodiment.
Figure 11:
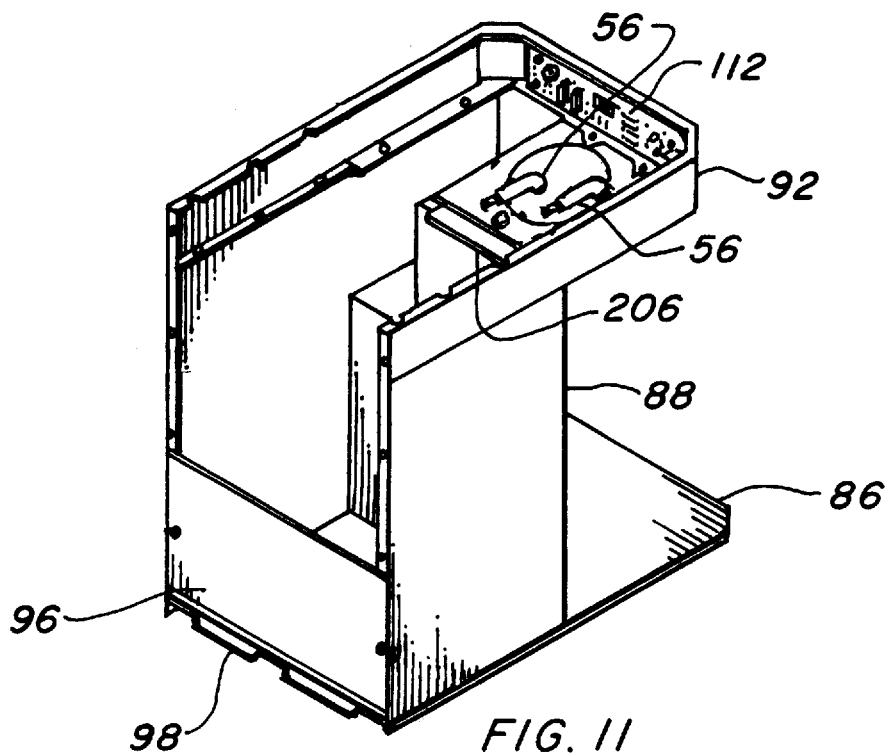
FIG. 11 is a partial isometric view of the empty assembled enclosure.

The best mode for carrying out the invention is presented in terms of a preferred embodiment, which utilizes basically all of the same elements as introduced in the inventor's prior patent application Ser. No. 08/810,708, now U.S. Pat. No. 5,836,236. In order to not be repetitive in the description of the original elements, the drawings and element identification numbers will remain the same, as only a slight enlargement in the physical size is required in order to allow for a bigger server and increased volume in the water holding tanks.

The following list enumerates all of the common elements by original identification numbers and description from the inventions prior patent to which the improvement is directed. It should be noted that a few of the detailed elements are lacking, as they had little to do with the improvement and become irrelevant and, therefore, are omitted.

30 brew water tank
34 probe recesses
36 probe recess ring
38 brew pre-heater
50 brew boiler
52 check valve
56 spray head
58 inlet elbow
60 circular body
62 raised ring
64 groove
66 diverting disc
68 extending fingers
70 hot water tank
72 water heater
74 water dispense solenoid valve
76 safety switch
80 brew fill solenoid valve
82 water fill solenoid valve
84 metallic enclosure
86 base
88 column
90 extension column
92 top housing
94 top cover
96 lower back plate
98 base stiffener
100 spray head holder
112 indicating control panel
114 coffee brew cone
116 sub-assembly
124 upper back plate
132 power cord
134 brew thermistor
136 water thermistor
140 electronic controller
152 brew fill probe
154 brew 25 oz. probe (reidentified as brew 1st level probe)
156 brew 50 oz. probe (reidentified as brew 2nd level probe)
158 brew 75 oz. probe (reidentified as brew 3rd level probe)
160 brew ground probe
162 water fill probe
164 water safety probe
166 water ground probe
170 coffee pot
172 coffee server Elements 154, 156 and 158 have been reidentified relative to their function, rather than a specific volumetric quantity, as was the case in the prior patent.

Figure 12:
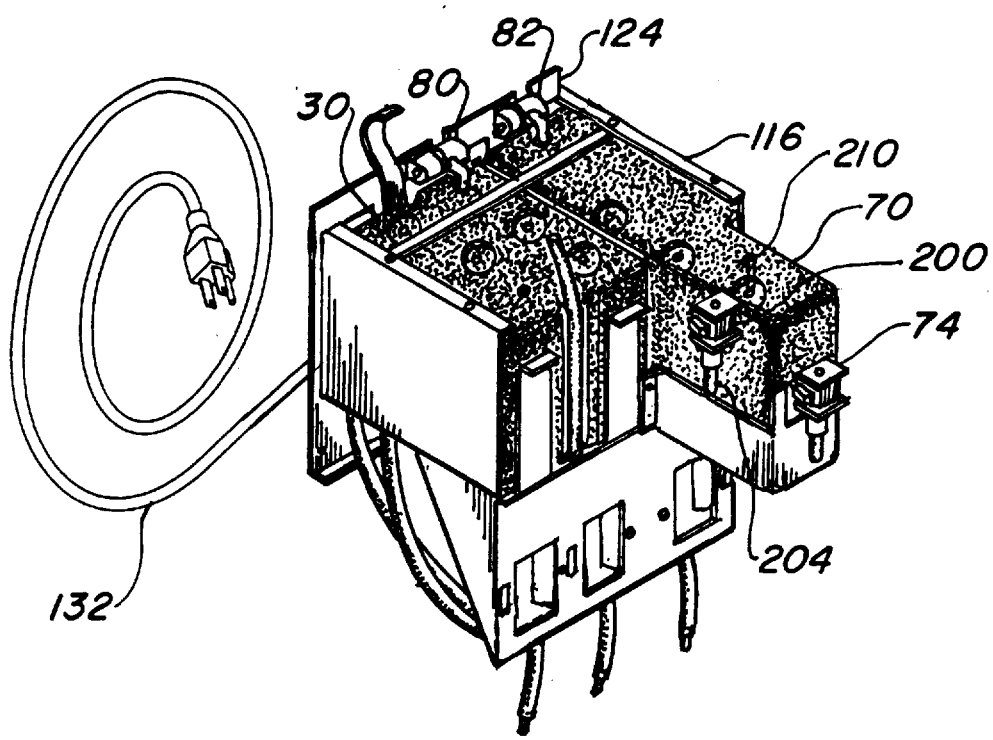
FIG. 12 is a partial isometric view of the completed sub-assembly ready to be inserted into the enclosure.
Figure 13:
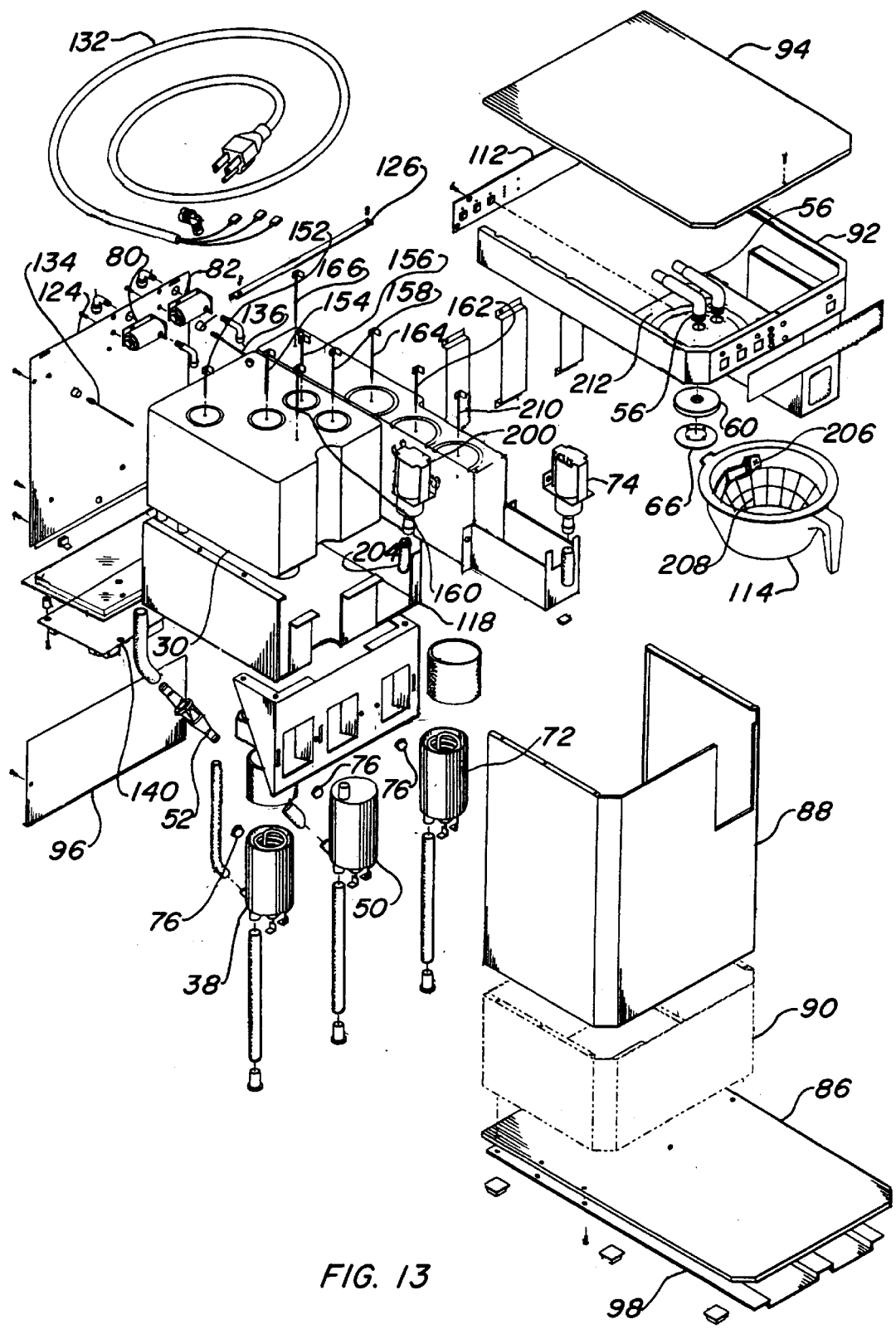
FIG. 13 is an exploded view of the preferred embodiment with the extension column shown dotted.
Figure 14:
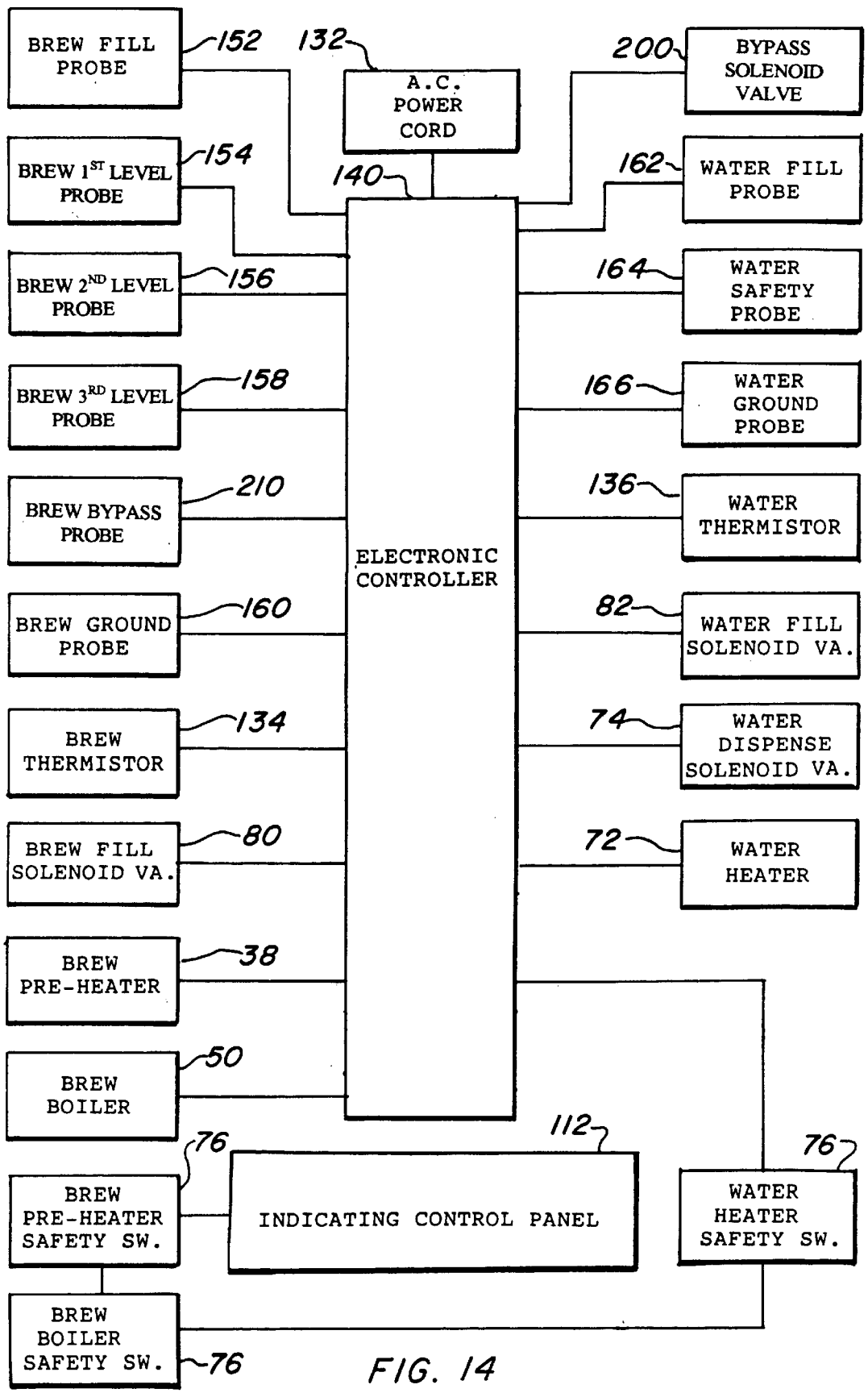
FIG. 14 is a block diagram of the preferred embodiment electrical system.

The improvement includes the addition of bypass hot water means for adding a predetermined volume of hot water from the hot water tank 70 to an external server 172 or pot 170. The bypass hot water means is in the form of a electromagnetic bypass solenoid valve 200 that is in fluid communication with the hot water tank 70 and is actuated upon demand of the electronic controller 140. The bypass solenoid valve 200 is depicted in FIGS. 12 through 14, and is attached to the hot water tank 70 through a female boss 202, as illustrated in FIG. 5. The solenoid valve 200 is configured with a barbed inlet and outlet and the inlet is inserted into the boss 202 and held in place by friction. The outlet of the solenoid valve 200 includes a length of hose 204 for directing the flow of hot water. The bypass solenoid valve 200 is of the same basic configuration as the existing water dispense solenoid valve 74, shown in FIGS. 12 and 13.

In order to bypass hot water into the server 172 or pot 170, the coffee brew cone 114 has been modified to include a baffle 206 that is located within the cone opposite the handle and is formed in a hat shape with an inwardly facing angular bend, so as to hold the coffee ground filter away from the edge. The bypass solenoid valve 200 with its extending hose 204 is in alignment above the baffle 206, permitting hot water from the hot water tank 70 to flow straight onto the edge of the cone 114 and on to the external container, such as the server 172 or pot 170, without passing through the coffee grounds held by the filter inside the cone. FIG. 13 depicts the modified cone 114 and a wire basket 208, or the like, may be added within cone to support the added weight of a larger amount of coffee grounds.

In order to dispense the appropriate predetermined amount of bypass hot water, a brew bypass probe 210 is added into the hot water tank 70 by the addition of another probe recess 34 and ring 36, as illustrated in FIGS. 5 and 6. The probe 210 is similar in operation and configuration to the water fill probe 162 and water safety probe 164, etc., and varies only by its length, which is approximately 2 inches (5.08 cm) long in the preferred embodiment of the improvement, using a slightly larger hot water tank 70. In operation the brew bypass probe 210 functions in like manner as its companion probes in the tank 70 since it is a metallic rod through which an electrical circuit is passed to the water ground probe 166, using water within the tank to complete the electrical circuit, consequently indicating water volume to the electronic controller 140.

In order to increase the capacity of the coffee brewer and hot water dispenser without unduly increasing its size and to use existing technology already developed and patented by the inventor, multiple sequence process means is added to the device. This process means is actuated by the electronic controller 140 and initiates a number of dispensing cycles from the brew boiler 50 over coffee grounds in the cone 114. As the controller 140 already contains sequence control using the volume measuring probes 154, 156 and 158, and a fill probe 152, utilizing a series of cycles is easily accomplished. The series of boiling hot water and forcing it into the spray head 56 and then refilling the tank is already in effect in the prior art, therefore, repeating the same sequence is easily accomplished with slight modification to the controller 140. The bypass hot water means is required to be actuated only once during a brewing cycle, however, the controller 140 may regulate the brew water fill, level, temperature and dispensing a prearranged number of times until the external server is filled. It will be noted that this plurality of cycles does not limit the ultimate capacity of the device, as the control remains the same and only slight changes in increasing the physical size is necessary to elevate and expand the devices capacity to almost unlimited levels.

It should be noted, however, that in order to handle larger amounts of coffee grounds it has been found that to reach an optimum level of brewing quality the circular spray head means must be expanded to utilize a pair of spray heads 56, each including an inlet elbow 58 threadably connected to a skirted disk-shaped circular body 60 having a raised ring 62 with a groove 64 therein surrounding ingress of the elbow. Further, a round cone shaped diverting disc 66, of a diameter less than that of the body 60, having a plurality of extending fingers 68 is snapped over the ring 62 into the groove 64. This arrangement leaves a gap, or flowpath, between the body 60 and disc 66, permitting boiling water to be evenly distributed over each cone disc 66 and flow from each head 56 through the gap in a predetermined circular manner. This dual head requires a modified spray head holder 212, which is illustrated along with the spray head 56 in FIGS. 7 through 10.

In operation the coffee brewer and hot water dispenser operates, as described, in the inventors previous patent with the exception of the one time, per brew, of the bypass hot water and the multiple sequence process of the brewing cycle. It should also be recognized that this improvement may require larger physical size tanks 30 and 70, along with the metallic enclosure 84 in order to accommodate a larger external server. While the invention has been described in complete detail and pictorially shown in the accompanying drawings, it is not to be limited to such details, since many changes and modifications may be made in the invention without departing from the spirit and scope thereof. Hence, it is described to cover any and all modifications and forms which may come within the language and scope of the appended claims.

What is claimed is:

1. An improved coffee brewer and hot water dispenser apparatus attached to city water and electrical power of the type having, a brew water tank receiving and storing water from an external source, a brew pre-heater in mechanical and fluid communication with said brew water tank for heating and maintaining brew water temperature therein using heat produced by electrical energy, a brew boiler in fluid communication with said brew water tank for boiling pre-heated water from the brew tank for coffee brewing using heat produced by electrical power, circular spray head means for receiving boiling water from said brew boiler and distributing boiling water evenly over coffee grounds in a uniform parametric manner, a hot water tank receiving and storing water from an external source, a hot water heater in mechanical and fluid communication with said hot water tank for heating and maintaining water temperature therein using heat produced by electrical power, hot water dispensing means fluidly connected to said hot water tank for supplying heated water to an external container for food and beverages, and an electronic controller interconnected with an indicating control panel defining means to regulate both brew water and hot water fill, level, temperature and dispensing, also process indicating and selection means, permitting a user to select on/off function, half and full pot brew levels, view brewing progress intervals, viewing when it is safe to remove coffee containing brew cone, viewing heater malfunction and initiate hot water dispensing, wherein the improvement comprises;

bypass hot water means for adding a predetermined volume of hot water from the hot water tank to an external server for receiving and distributing brewed coffee, and multiple sequence process means actuated by the electronic controller initiating a plurality of dispensing cycles from the brew boiler distributing boiling water over coffee grounds in succession until an external server is filled.

2. The coffee brewer and hot water dispenser apparatus as recited in claim 1 wherein said bypass hot water means further comprises an electromagnetic bypass solenoid valve in fluid communication with the hot water tank actuated upon demand of the electronic controller.

3. The coffee brewer and hot water dispenser apparatus as recited in claim 2 further comprising a baffle within a coffee brew cone in alignment with said bypass solenoid valve such that a predetermined volume of hot water from the hot water tank will flow directly into an external server without passing through any coffee grounds.

4. The coffee brewer and hot water dispenser apparatus as recited in claim 1 wherein said bypass hot water means further comprises a brew bypass probe contained within the hot water tank for measuring a predetermined volume of hot water.

5. The coffee brewer and hot water dispenser apparatus recited in claim 4 wherein said brew bypass probe further comprises a metallic rod through which an electrical circuit is passed to a ground probe using water within the hot water tank as a conductor to complete an electrical circuit, thus indicating water volume to the electronic controller.

6. The coffee brewer and hot water dispenser apparatus as recited in claim 1 further comprising bypass hot water means is energized by the electronic controller only once during a brewing cycle.

7. The coffee brewer and hot water dispenser apparatus as recited in claim 1 wherein said plurality of dispensing cycles further comprises said electronic controller defining means to regulate brew water fill, level, temperature and dispensing a prearranged number of times until an external server is filled.

8. The coffee brewer and hot water dispenser apparatus as recited in claim 1 wherein said circular spray head means further comprises a pair of inlet elbows each threadably connected to a skirted dish-shaped circular body having a raised ring with a groove therein surrounding ingress of the elbow and a round cone-shaped diverting disc of a diameter less than that of the body, having a plurality of extending fingers snapped over the ring into the groove, leaving a gap for a flowpath between each body and disc, thereby permitting boiling water to be evenly distributed over each cone disc and flow from each head through a gap between the body and disc in a even and predetermined circular manner.

* * * * *